United States Patent
Gobius Du Sart et al.

(10) Patent No.: US 12,351,678 B2
(45) Date of Patent: Jul. 8, 2025

(54) PROCESS FOR PREPARING STABILIZED ALIPHATIC POLYESTER, AND COMPOSITIONS OBTAINED THEREWITH

(71) Applicant: TotalEnergies Corbion B.V., Gorinchem (NL)

(72) Inventors: Gerrit Gobius Du Sart, DA Herwijnen (NL); Wilko De Lang, Utrecht (NL)

(73) Assignee: TotalEnergies Corbion B.V., Gorinchem (NL)

(*) Notice: Subject to any disclaimer, the term of this patent is extended or adjusted under 35 U.S.C. 154(b) by 854 days.

(21) Appl. No.: 17/616,032

(22) PCT Filed: May 29, 2020

(86) PCT No.: PCT/EP2020/065066
§ 371 (c)(1),
(2) Date: Dec. 2, 2021

(87) PCT Pub. No.: WO2020/245063
PCT Pub. Date: Dec. 10, 2020

(65) Prior Publication Data
US 2022/0306799 A1    Sep. 29, 2022

(30) Foreign Application Priority Data
Jun. 3, 2019 (EP) .................... 19177894

(51) Int. Cl.
*C08G 63/08* (2006.01)
*C08G 63/78* (2006.01)
(Continued)

(52) U.S. Cl.
CPC ............. *C08G 63/08* (2013.01); *C08G 63/78* (2013.01); *C08K 5/3725* (2013.01)

(58) Field of Classification Search
None
See application file for complete search history.

(56) References Cited

U.S. PATENT DOCUMENTS 5,338,822 A * 8/1994 Gruber .................... A61L 31/06
525/413
2010/0093946 A1   4/2010 Thatcher et al.
(Continued)

FOREIGN PATENT DOCUMENTS

CN          101012305 A  *  8/2007
FR          1523848 A       5/1968
(Continued)

OTHER PUBLICATIONS

Sobczak et al.,"Note: Polymerization of Cyclic Esters Using Aminoacid Initiators," Journal of Macromolecular Science, Part A: Pure and Applied Chemistry, vol. 45, pp. 872-877 (2008) (Year: 2008).*
(Continued)

*Primary Examiner* — Ha S Nguyen
(74) *Attorney, Agent, or Firm* — Amster, Rothstein & Ebenstein LLP

(57) ABSTRACT

The present invention relates to a process for the preparation of a composition comprising aliphatic polyester by ring-opening polymerization of cyclic ester monomers, said process comprising the steps of:
(a) providing cyclic ester monomers and polymerization catalyst to a reactor,
(b) melt polymerizing said cyclic ester monomers to form a composition comprising aliphatic polyester,
(c) stabilizing the composition against aliphatic polyester depolymerization by incorporating therein or applying thereto at least one stabilizing agent, thereby obtaining a melt-stable composition, and
(d) optionally removing at least a portion of the residual cyclic ester monomers;
wherein said stabilizing agent is a compound of formula (I)

(Continued)

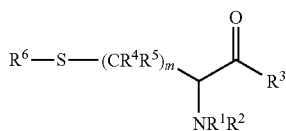

(I)

wherein $R^1$, $R^2$, $R^3$, m, $R^4$, $R^5$, and $R^6$ are as defined in the claims. The present invention also relates to a process for stabilizing an aliphatic polyester against depolymerization comprising the steps of (a) forming an aliphatic polyester, and (b) stabilizing the polyester against depolymerization by incorporating therein or applying thereto at least one stabilizing agent, thereby obtaining a melt-stable polyester, wherein said stabilizing agent is a compound of formula (I). The present invention also relates to the use of a compound of formula (I) as a stabilizing agent against aliphatic polyester depolymerization.

17 Claims, 4 Drawing Sheets

(51) Int. Cl.
 C08G 63/91 (2006.01)
 C08K 5/37 (2006.01)
 C08K 5/372 (2006.01)
 C08L 67/04 (2006.01)

(56) References Cited

U.S. PATENT DOCUMENTS

2015/0004257 A1* 1/2015 Reynolds .................. A61P 3/00
 514/777
2017/0367964 A1 12/2017 Yamamoto et al.

FOREIGN PATENT DOCUMENTS

WO 94/07949 A1 4/1994
WO 99/50345 A1 10/1999

OTHER PUBLICATIONS

PCT/EP2020/065066 International Search Report and Written Opinion dated Aug. 21, 2020 (10 p.).
PCT/EP2020/065066 Request for Chapter II Demand dated Apr. 2, 2021 (8 p.).
PCT/EP2020/065066 International Preliminary Report on Patentability dated Sep. 3, 2021 (16 p.).

* cited by examiner

PROCESS FOR PREPARING STABILIZED ALIPHATIC POLYESTER, AND COMPOSITIONS OBTAINED THEREWITH

CROSS-REFERENCE TO RELATED APPLICATIONS

This application claims the benefit of PCT/EP2020/065066 filed May 29, 2020, which claims priority from EP19177894.3 filed Jun. 3, 2019, which is incorporated herein by reference in its entirety for all purposes.

FIELD OF THE INVENTION

The present invention relates to process for preparing stabilized aliphatic polyester as well as compositions obtained therewith.

BACKGROUND OF THE INVENTION

Aliphatic polyesters based on cyclic ester monomers such as lactide, glycolide, trimethylene carbonate (TMC), epsilon-caprolactone, and p-dioxanone, and combinations thereof have many attractive properties. They often have high biocompatibility and attractive resorbability properties, which makes them suitable for the preparation of scaffolds and implants tor use in human or animal bodies. Further, in particular, polylactide, also referred to as polylactic acid, is a promising material in the field of technical applications for, e.g., packaging materials.

The use of lactic acid and lactide to manufacture biodegradable polymers is well-known. Such polymers have been extensively used in food contact applications and medical industries. Processes developed for the manufacture of polymers to be utilized in the food and/or medical industry have incorporated techniques which respond to the need for high purity in the final product.

Generally, manufacturers of such polymers will convert the monomers into polymer beads, resins or other pelletized or powdered products with as little residual monomers as possible. The polymer in this form is then sold to end users who extrude, blow-mold, cast films, blow films, thermoform, injection-mold or fiber-spin the polymer at elevated temperatures to form useful articles. The above processes generally proceed through melt-processing.

It is generally known that native lactide polymers or polylactide are unstable during processing at elevated temperatures, as, for example, during melt-processing by end-user purchasers of polymer resins. One of the proposed reaction pathways includes the "back-biting" reaction of a terminal hydroxyl group to form lactide. Other proposed reaction pathways include: reaction of the hydroxyl end group in a "back-biting" reaction to form cyclic oligomers, chain scission through hydrolysis of the ester bonds, an intramolecular beta-elimination reaction producing a new acid end group and an unsaturated carbon-carbon bond, and radical chain decomposition reactions. It is apparent that degradation of the polymer during melt-processing must be reduced to a commercially acceptable rate while the polymer maintains the qualities of biodegradation or compostability which make it so desirable. That is achieved through deactivation of the catalyst used for polymerization, since uncatalyzed lactide reformation is slow enough to not be of practical relevance.

In addition, the melt polymerization of lactide will result in a thermodynamic equilibrium amount of residual lactide, which needs to be removed to typically well below 1%; it is exactly the backbiting reaction which will counteract this removal and desires to re-establish this equilibrium. Therefore, already during production of polylactide and before removal of the residual lactide the catalyzed backbiting reaction must be prevented through stabilization.

Stabilizers have been used to counteract catalyzed lactide reformation. Many different additives have been proposed, but the vast majority are either not acceptable for food contact applications at all (because of health risks involved with the additive) or are acceptable at only very low migration limits.

Accordingly, a need exists for a lactide polymer composition which is melt-stable under the elevated temperatures common to melt-processing and which are suitable for food contact applications.

The present invention addresses these needs.

SUMMARY OF THE INVENTION

In a first aspect, the present invention provides a process for the preparation of a composition comprising aliphatic polyester by ring-opening polymerization of cyclic ester monomers, said process comprising the steps of:
(a) providing cyclic ester monomers and polymerization catalyst to a reactor,
(b) melt polymerizing said cyclic ester monomers to form a composition comprising aliphatic polyester,
(c) stabilizing the composition against aliphatic polyester depolymerization by incorporating therein or applying thereto at least one stabilizing agent thereby obtaining a melt-stable composition, and
(d) optionally removing at least a portion of the residual cyclic ester monomers;
wherein said stabilizing agent is a compound of formula (I)

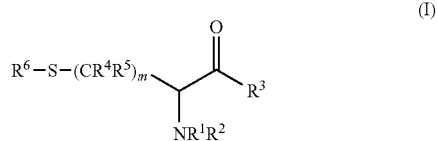

wherein
$R^1$ is hydrogen or $C_{1-6}$alkyl;
$R^2$ is selected from the group comprising hydrogen, $C_{1-6}$alkyl, HO—C(=O)—CH(NHR$^7$)—(CH$_2$)$_n$—C(=O)—, and $C_{1-6}$alkylcarbonyl;
$R^3$ is selected from the group comprising hydroxyl, $C_{1-6}$alkoxy and —NH—(CH$_2$)$_p$—C(=O)—OH;
m is an integer selected from 0, 1 or 2; n is an integer selected from 1 or 2; p is an integer selected from 1 or 2;
each $R^4$ is independently selected from hydrogen or $C_{1-6}$alkyl;
each $R^5$ is independently selected from hydrogen or $C_{1-6}$alkyl;
$R^6$ is selected from hydrogen, or a group of formula

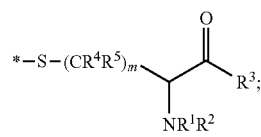

wherein * indicates the point of attachment to the S of formula (I); and

R$^7$ is selected from the group comprising hydrogen, C$_{1-6}$alkyl, and C$_{1-6}$alkylcarbonyl.

In a second aspect, the present invention provides a composition directly obtained by a process according to the first aspect of the invention. The present invention also relates to applications of such composition, for example to make a shaped article. The compositions of the invention are particularly suitable for food contact applications.

In a third aspect, the present invention provides a process for stabilizing an aliphatic polyester against depolymerization, comprising the steps of (a) forming an aliphatic polyester, and (b) stabilizing the polyester against depolymerization by incorporating therein or applying thereto at least one stabilizing agent, thereby obtaining a melt-stable polyester, wherein said stabilizing agent is a compound of formula (I);

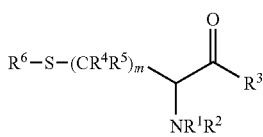

(I)

wherein
R$^1$ is hydrogen or C$_{1-6}$alkyl;
R$^2$ is selected from the group comprising hydrogen, C$_{1-6}$alkyl, HO—C(=O)—CH(NHR$^7$)—(CH$_2$)$_n$—C(=O)—, and C$_{1-6}$alkylcarbonyl;
R$^3$ is selected from the group comprising hydroxyl, C$_{1-6}$alkoxy and —NH—(CH$_2$)$_p$—C(=O)—OH;
m is an integer selected from 0, 1 or 2;
n is an integer selected from 1 or 2;
p is an integer selected from 1 or 2;
each R$^4$ is independently selected from hydrogen or C$_{1-6}$alkyl;
each R$^5$ is independently selected from hydrogen or C$_{1-6}$alkyl;
R$^6$ is selected from hydrogen, or a group of formula

*—S—(CR$^4$R$^5$)$_m$—C(=O)—R$^3$;
              |
           NR$^1$R$^2$ wherein * indicates the point of attachment to the S of formula (I), and R$^7$ is independently selected from the group comprising hydrogen, C$_{1-6}$alkyl, and C$_{1-6}$alkylcarbonyl.

In a fourth aspect, the present invention also provides the use of a compound of formula (I) as a stabilizing agent against aliphatic polyester depolymerization,

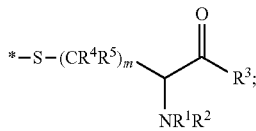

(I)

wherein
R$^1$ is hydrogen or C$_{1-6}$alkyl;
R$^2$ is selected from the group comprising hydrogen, C$_{1-6}$alkyl, HO—C(=O)—CH(NHR$^7$)—(CH$_2$)$_n$—C(=O)—, and C$_{1-6}$alkylcarbonyl;
R$^3$ is selected from the group comprising hydroxyl, C$_{1-6}$alkoxy and —NH—(CH$_2$)$_p$—C(=O)—OH;
m is an integer selected from 0, 1 or 2;
n is an integer selected from 1 or 2;
p is an integer selected from 1 or 2;
each R$^4$ is independently selected from hydrogen or C$_{1-6}$alkyl;
each R$^5$ is independently selected from hydrogen or C$_{1-6}$alkyl;
R$^6$ is selected from hydrogen, or a group of formula

*—S—(CR$^4$R$^5$)$_m$—C(=O)—R$^3$;
              |
           NR$^1$R$^2$ wherein * indicates the point of attachment to the S of formula (I), and R$^7$ is selected from the group comprising hydrogen, C$_{1-6}$alkyl, and C$_{1-6}$alkylcarbonyl.

According to the present invention, a melt-stable aliphatic polyester composition, preferably a melt-stable polylactide composition is obtained when said polyester composition, preferably polylactide composition is stabilized with at least one compound of formula (I), preferably in an amount sufficient to inhibit generation of lactide in the melt.

Exemplary compounds in this group are L-cysteine, L-cystine, glutathione, and N-acetyl-L-cysteine, which compounds are known food additives, thus providing a chemical stabilizing solution which is preferred in food contact applications.

The above and other characteristics, features and advantages of the present invention will become apparent from the following detailed description, which illustrate, by way of example, the principles of the invention.

DETAILED DESCRIPTION

Figure 1:
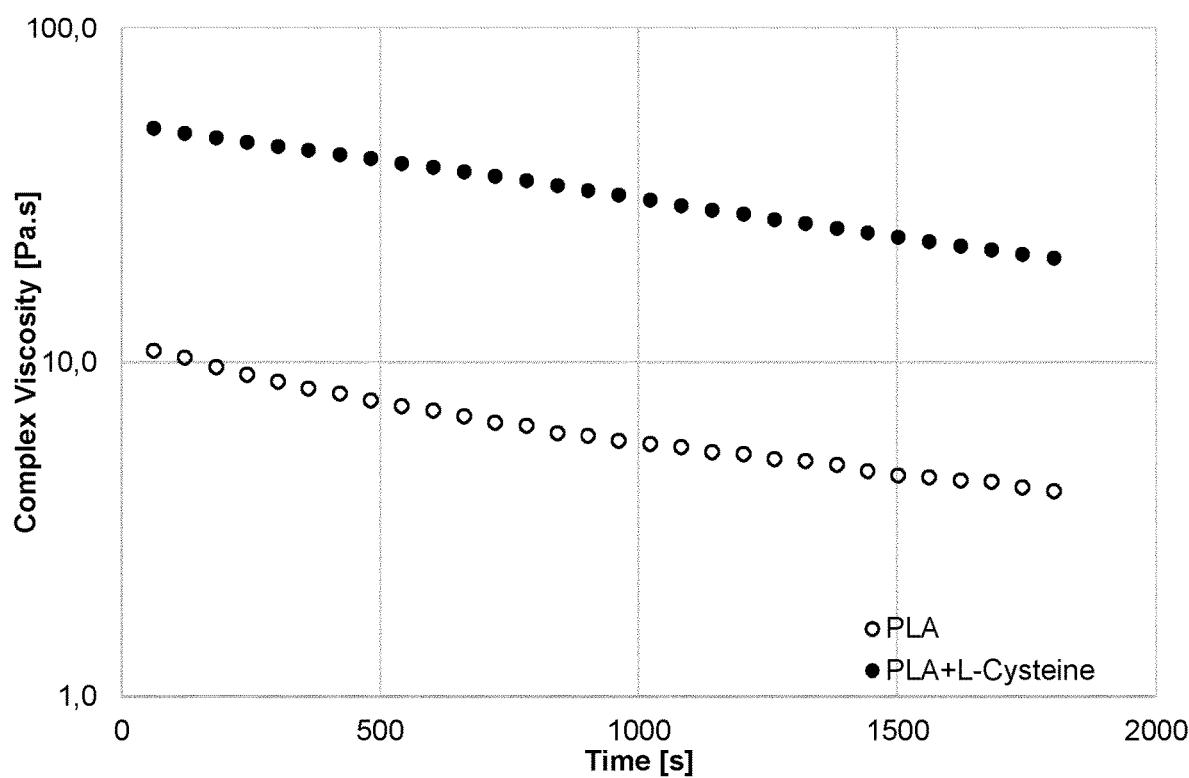
FIG. 1 represents a graph plotting the complex viscosity as a function of time for unstabilized PLA, and L-Cysteine-stabilized PLA samples.
Figure 2:
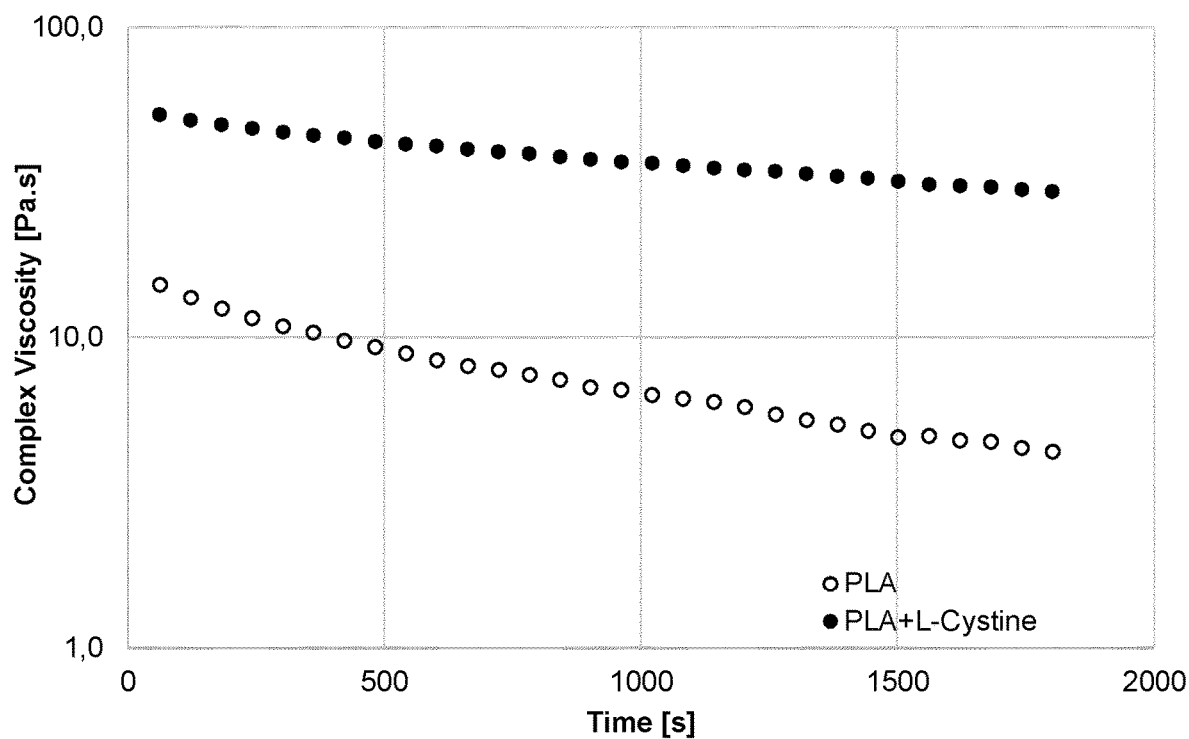
FIG. 2 represents a graph plotting the complex viscosity as a function of time for unstabilized PLA, and L-Cystine-stabilized PLA samples.
Figure 3:
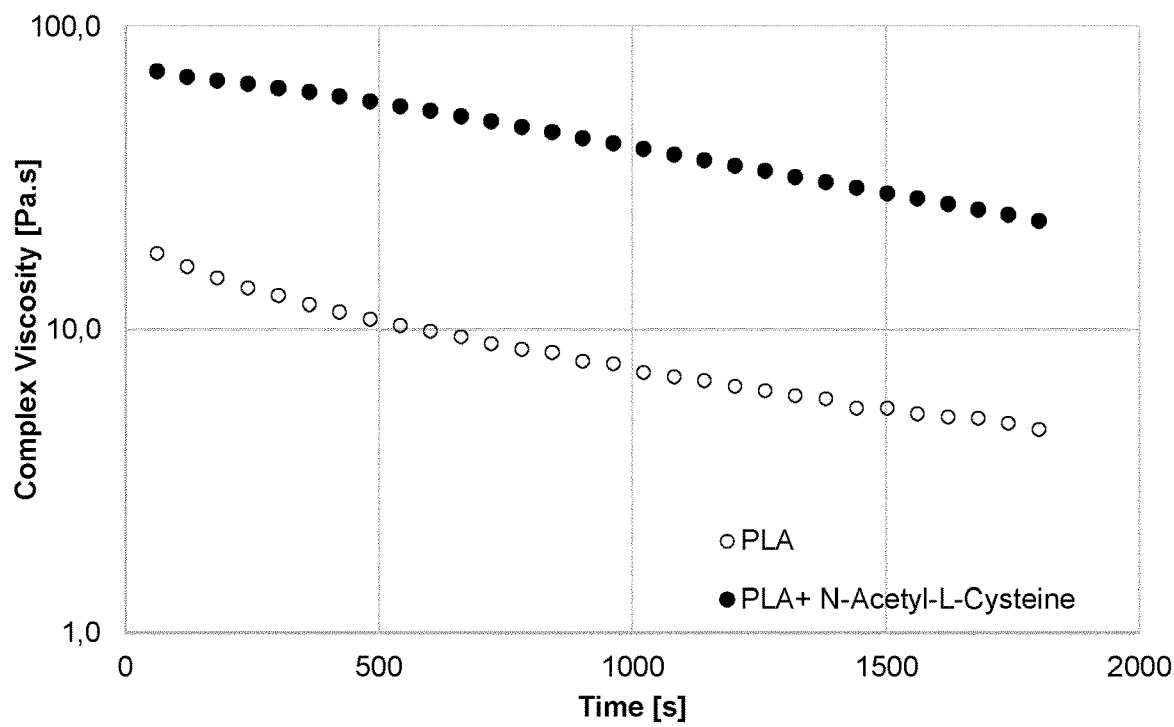
FIG. 3 represents a graph plotting the complex viscosity as a function of time for unstabilized PLA, and N-acetyl-L-Cysteine-stabilized PLA samples.
Figure 4:
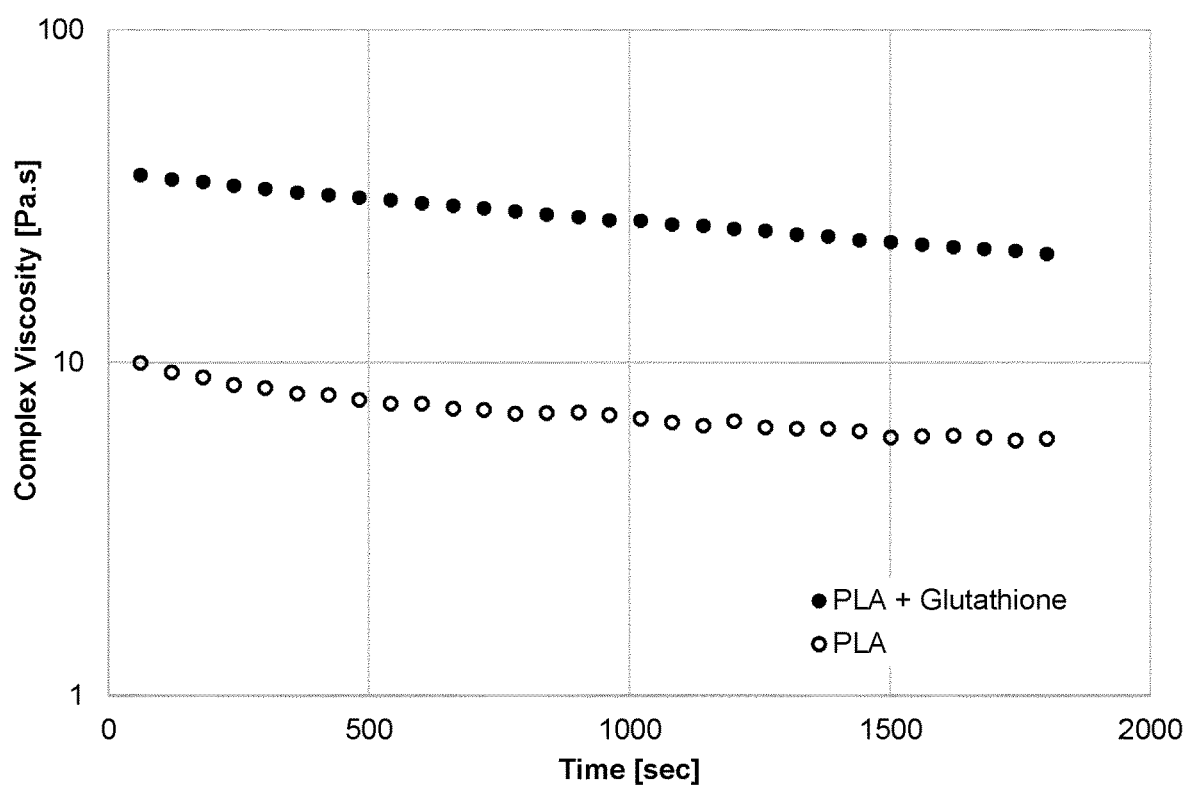
FIG. 4 represents a graph plotting the complex viscosity as a function of time for unstabilized PLA, and Glutathione-stabilized PLA samples.

When describing the invention, the terms used are to be construed in accordance with the following definitions, unless a context dictates otherwise.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

As used in the specification and the appended claims, the singular forms "a", "an," and "the" include plural referents unless the context clearly dictates otherwise. By way of example, "a step" means one step or more than one step.

Unless defined otherwise, all technical and scientific terms used herein have the same meaning as is commonly understood by one of skill in the art. All publications referenced herein are incorporated by reference thereto.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

Whenever the term "substituted" is used in the present invention, it is meant to indicate that one or more hydrogens on the atom indicated in the expression using "substituted" is replaced with a selection from the indicated group, provided that the indicated atom's normal valency is not exceeded, and that the substitution results in a chemically stable compound. Where groups can be substituted, such groups may be substituted with one or more, and preferably one, two or three substituents.

The term "alkyl", as a group or part of a group, refers to a hydrocarbyl group of formula $C_nH_{2n+1}$ wherein n is a number of at least 1. Alkyl groups may be linear, or branched and may be substituted as indicated herein. Preferably, the alkyl group comprises from 1 to 6 carbon atoms, preferably from 1 to 5 carbon atoms, preferably from 1 to 4 carbon atoms, preferably from 1 to 3 carbon atoms, preferably from 1 to 2 carbon atoms. When a subscript is used herein following a carbon atom, the subscript refers to the number of carbon atoms that the named group may contain. For example, the term "$C_{1-6}$alkyl", as a group or part of a group, refers to a hydrocarbyl group of Formula $C_nH_{2n+1}$ wherein n is a number ranging from 1 to 6. For example, $C_{1-6}$alkyl includes all linear or branched alkyl groups having 1 to 6 carbon atoms, and thus includes for example methyl, ethyl, n-propyl, i-propyl, 2-methyl-ethyl, butyl and its isomers (e.g. n-butyl, i-butyl and t-butyl); pentyl and its isomers, hexyl and its isomers, and the like. For example, $C_{1-4}$alkyl includes all linear or branched alkyl groups having 1 to 4 carbon atoms, and thus includes for example methyl, ethyl, n-propyl, i-propyl, 2-methyl-ethyl, butyl and its isomers (e.g. n-butyl, i-butyl and t-butyl), and the like.

The term "$C_{1-6}$alkylcarbonyl" refers to a carbonyl group linked to an alkyl radical i.e. to form —C(=O)$R^a$, wherein $R^a$ is as defined above for $C_{1-6}$alkyl.

The term "$C_{1-6}$alkoxy" refers to group of formula —O—$R^a$, wherein $R^a$ is as defined above for $C_{1-6}$alkyl.

The terms described above and others used in the specification are well understood to those in the art.

Preferred statements (features) and embodiments of the processes, compositions, and uses of this invention are set herein below. Each statement and embodiment of the invention so defined may be combined with any other statement and/or embodiment, unless clearly indicated to the contrary. In particular, any feature indicated as being preferred or advantageous may be combined with any other features or statements indicated as being preferred or advantageous. Hereto, the present invention is in particular captured by any one or any combination of one or more of the below numbered statements and embodiments, with any other aspect and/or embodiment.

1. Process for the preparation of a composition comprising aliphatic polyester by ring-opening polymerization of cyclic ester monomers, said process comprising the steps of: (a) providing cyclic ester monomers and polymerization catalyst to a reactor, (b) melt polymerizing said cyclic ester monomers to form a composition comprising aliphatic polyester, (c) incorporating therein or applying thereto at least one compound of formula (I), and (d) optionally removing at least a portion of the residual (unreacted) cyclic ester monomers;

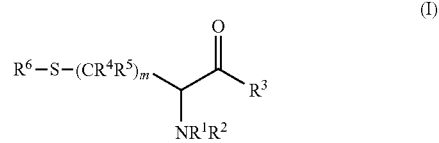

wherein
$R^1$ is hydrogen or $C_{1-6}$alkyl;
$R^2$ is selected from the group comprising hydrogen, $C_{1-6}$alkyl, HO—C(=O)—CH(NHR$^7$)—(CH$_2$)$_n$—C(=O)—, and $C_{1-6}$alkylcarbonyl;
$R^3$ is selected from the group comprising hydroxyl, $C_{1-6}$alkoxy and —NH—(CH$_2$)$_p$—C(=O)—OH;
m is an integer selected from 0, 1 or 2;

n is an integer selected from 1 or 2;
p is an integer selected from 1 or 2;
each $R^4$ is independently selected from hydrogen or $C_{1-6}$alkyl;
each $R^5$ is independently selected from hydrogen or $C_{1-6}$alkyl;
$R^6$ is selected from hydrogen, or a group of formula

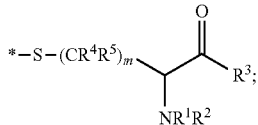

wherein * indicates the point of attachment to the S of formula (I), and
$R^7$ is selected from the group comprising hydrogen, $C_{1-6}$alkyl, and $C_{1-6}$alkylcarbonyl.

2. Process for the preparation of a composition comprising aliphatic polyester by ring-opening polymerization of cyclic ester monomers, said process comprising the steps of:
(a) providing cyclic ester monomers and polymerization catalyst to a reactor,
(b) melt polymerizing said cyclic ester monomers to form a composition comprising aliphatic polyester,
(c) stabilizing the composition against aliphatic polyester depolymerization by incorporating therein or applying thereto at least one stabilizing agent, thereby obtaining a melt-stable composition, and
(d) optionally removing at least a portion of the residual cyclic ester monomers;
wherein said stabilizing agent is a compound of formula (I)

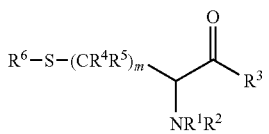

wherein
$R^1$ is hydrogen or $C_{1-6}$alkyl;
$R^2$ is selected from the group comprising hydrogen, $C_{1-6}$alkyl, HO—C(=O)—CH(NHR$^7$)—(CH$_2$)$_n$—C(=O)—, and $C_{1-6}$alkylcarbonyl;
$R^3$ is selected from the group comprising hydroxyl, $C_{1-6}$alkoxy and —NH—(CH$_2$)$_p$—C(=O)—OH;
m is an integer selected from 0, 1 or 2;
n is an integer selected from 1 or 2;
p is an integer selected from 1 or 2;
each $R^4$ is independently selected from hydrogen or $C_{1-6}$alkyl;
each $R^5$ is independently selected from hydrogen or $C_{1-6}$alkyl;
$R^6$ is selected from hydrogen, or a group of formula

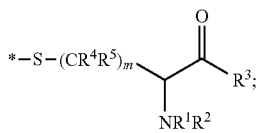

wherein * indicates the point of attachment to the S of formula (I), and
$R^7$ is selected from the group comprising hydrogen, $C_{1-6}$alkyl, and $C_{1-6}$alkylcarbonyl.

3. The process according to statement 1 or 2, wherein said aliphatic polyester is polylactide prepared by ring-opening polymerization of lactide, said process comprising the steps of: (a) providing lactide and polymerization catalyst to a reactor, (b) melt polymerizing said lactide to form a composition comprising polylactide, (c) incorporating therein or applying thereto at least one compound of formula (I), and (d) optionally removing at least a portion of the residual (unreacted) lactide.

4. The process according to any one of statements 1-3, wherein said aliphatic polyester is polylactide prepared by ring-opening polymerization of lactide, said process comprising the steps of: (a) providing lactide and polymerization catalyst to a reactor, (b) melt polymerizing said lactide to form a composition comprising polylactide, (c) stabilizing the composition against polylactide depolymerization by incorporating therein or applying thereto at least one stabilizing agent, wherein said stabilizing agent is at least one compound of formula (I), thereby obtaining a melt-stable composition, and (d) optionally removing at least a portion of the residual lactide.

5. The process according to any one of statements 1-4, wherein said compound of formula (I) inhibits generation of lactide in a melt of the polylactide composition.

6. The process according to any one of statements 1-5, wherein
$R^1$ is hydrogen;
$R^2$ is selected from the group comprising hydrogen, $C_{1-6}$alkyl, HO—C(=O)—CH(NHR$^7$)—(CH$_2$)$_n$—C(=O)—, and $C_{1-6}$alkylcarbonyl;
$R^3$ is hydroxyl or —NH—CH$_2$—C(=O)—OH;
m is an integer selected from 1 or 2;
n is an integer selected from 1 or 2;
p is an integer selected from 1 or 2;
each $R^4$ and $R^5$ is hydrogen;
$R^6$ is selected from hydrogen, or a group of formula

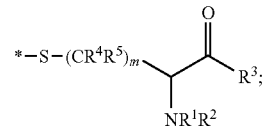

and
$R^7$ is hydrogen.

7. The process according to any one of statements 1-6, wherein compound of formula (I) is selected from the group comprising cysteine, cystine, N-acetyl-cysteine, N-acetyl-cystine, glutathione, stereoisomers thereof and mixtures thereof.

8. The process according to any one of statements 1-7, wherein compound of formula (I) is present in an amount of at least 0.010% by weight, preferably at least 0.025% by weight based on the total weight of the polylactide. For example, said compound of formula (I) can be incorporated therein or applied thereto in an amount of at least 0.010% by weight, for example at least 0.020% by weight, for example at least 0.050% by weight, for example at least 0.075% by weight, for example at least 0.090% by weight, for example at least 0.10% by weight, based on the total weight of said aliphatic polyester composition, preferably said polylactide composition. For example, said compound of formula (I) can be incorporated therein or applied thereto in an amount of at most 0.50% by weight based on the total weight of said aliphatic polyester composition, preferably of said polylactide composition. For example, said compound of formula (I) can be incorporated therein or applied thereto in an amount of at most 0.30% by weight, for example at most 0.20% by weight, for example at most 0.18% by weight, for example at most 0.15% by weight, based on the total weight of said aliphatic polyester composition, preferably said polylactide composition.

9. The process according to any one of statements 1-8, wherein compound of formula (I) is incorporated therein or applied thereto in an amount ranging from 0.010% by weight to 0.5% by weight, for example from 0.025% by weight to 0.5% by weight, preferably from 0.050% by weight to 0.40% by weight, for example from 0.075% by weight to 0.30% by weight, for example at least 0.090% by weight to 0.20% by weight, for example from 0.095% by weight to 0.15% by weight, based on the total weight of said aliphatic polyester composition, preferably said polylactide composition.

10. The process according to any one of statements 1-9, comprising prior to step (c) or simultaneously with step (c) adding at least one antioxidant.

11. The process according to any one of statements 1-10, comprising further additives such as UV absorbers, and/or light-stabilizers.

12. The process according to any one of statements 1-11, wherein simultaneously or after step (c) the composition is subjected to one or more devolatilization steps (d).

13. The process according to any one of statements 1-12, step (c) is performed after the polymerization has reached its lactide equilibrium.

14. The process according to any one of statements 1-13, wherein the polymerization process is a batch melt process or a continuous melt process.

15. The process according to any one of statements 1-14, comprising the steps of i) continuously providing lactide and polymerization catalyst to a continuous mixing reactor for a first-polymerization, ii) continuously removing said first polymerized reaction mixture from the continuous mixing reactor and continuously providing said first polymerized reaction mixture to a plug flow reactor, iii) continuously removing the composition from the plug flow reactor, and (iv) incorporating therein or applying thereto at least one compound of formula (I).

16. The process according to statement 15, wherein the first reactor is a loop reactor.

17. The process according to statement 15, wherein the first reactor is a continuously stirred tank reactor.

18. The process according to statement 15, wherein the continuous mixing reactor and/or the plug flow reactor is a static mixer reactor.

19. The process according to any one of statements 1-18, wherein the polymerization is performed at temperatures of at least 100° C., for example at least 110° C., for example at least 120° C., for example at least 130° C.

20. Composition directly obtained by a process according to any one of statements 1-19, wherein said composition comprises polylactide and at least one stabilizing agent, wherein said stabilizing agent is a compound of formula (I).

21. A process for stabilizing an aliphatic polyester against depolymerization which comprises incorporating therein or applying thereto at least one compound of formula (I);

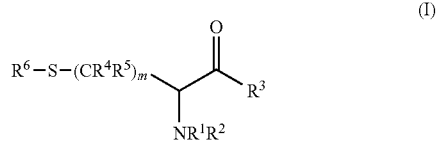

wherein
$R^1$ is hydrogen or $C_{1-6}$alkyl;
$R^2$ is selected from the group comprising hydrogen, $C_{1-6}$alkyl, HO—C(═O)—CH(NHR$^7$)—(CH$_2$)$_n$—C(═O)—, and $C_{1-6}$alkylcarbonyl;
$R^3$ is selected from the group comprising hydroxyl, $C_{1-6}$alkoxy and —NH—(CH$_2$)$_p$—C(═O)—OH;
m is an integer selected from 0, 1 or 2;
n is an integer selected from 1 or 2;
p is an integer selected from 1 or 2;
each $R^4$ is independently selected from hydrogen or $C_{1-6}$alkyl;
each $R^5$ is independently selected from hydrogen or $C_{1-6}$alkyl;
$R^6$ is selected from hydrogen, or a group of formula

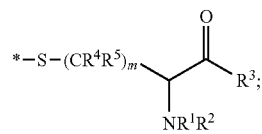

wherein * indicates the point of attachment to the S of formula (I), and
$R^7$ is selected from the group comprising hydrogen, $C_{1-6}$alkyl, and $C_{1-6}$alkylcarbonyl.

22. A process for stabilizing an aliphatic polyester against depolymerization, comprising the steps of (a) forming an aliphatic polyester, and (b) stabilizing the polyester against depolymerization by incorporating therein or applying thereto at least one stabilizing agent, thereby obtaining a melt-stable polyester, wherein said stabilizing agent is a compound of formula (I);

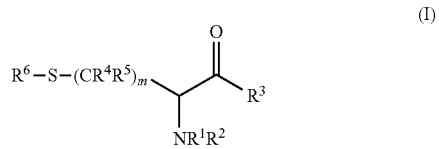

wherein
$R^1$ is hydrogen or $C_{1-6}$alkyl;
$R^2$ is selected from the group comprising hydrogen, $C_{1-6}$alkyl, HO—C(═O)—CH(NHR$^7$)—(CH$_2$)$_n$—C(═O)—, and $C_{1-6}$alkylcarbonyl;

R³ is selected from the group comprising hydroxyl, C$_{1-6}$alkoxy and —NH—(CH$_2$)$_p$—C(=O)—OH;

m is an integer selected from 0, 1 or 2;

n is an integer selected from 1 or 2;

p is an integer selected from 1 or 2;

each R⁴ is independently selected from hydrogen or C$_{1-6}$alkyl;

each R⁵ is independently selected from hydrogen or C$_{1-6}$alkyl;

R⁶ is selected from hydrogen, or a group of formula

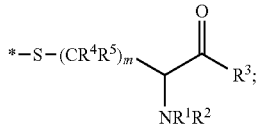

wherein * indicates the point of attachment to the S of formula (I)

R⁷ is selected from the group comprising hydrogen, C$_{1-6}$alkyl, and C$_{1-6}$alkylcarbonyl.

23. The process according to any one of statements 21-22, wherein said aliphatic polyester is a lactic acid based polyester, preferably polylactic acid.

24. The process according to any one of statements 21-23, wherein said compound of formula (I) is selected from the group comprising cysteine, cystine, N-acetyl-cysteine, N-acetyl-cystine, glutathione, stereoisomers thereof and mixtures thereof.

25. The process according to any one of statements 21-24, wherein said compound of formula (I) is incorporated therein or applied thereto in an amount of at least 0.025% by weight based on the total weight of said aliphatic polyester.

26. The process according to any one of statements 21-25, comprising incorporating or applying at least one antioxidant.

27. Use of a compound of formula (I) as a stabilizing agent against aliphatic polyester depolymerization,

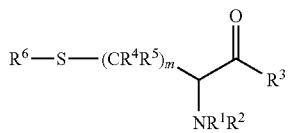

wherein

R¹ is hydrogen or C$_{1-6}$alkyl;

R² is selected from the group comprising hydrogen, C$_{1-6}$alkyl, HO—C(=O)—CH(NHR⁷)—(CH$_2$)$_n$—C(=O)—, and C$_{1-6}$alkylcarbonyl;

R³ is selected from the group comprising hydroxyl, C$_{1-6}$alkoxy and —NH—(CH$_2$)$_p$—C(=O)—OH;

m is an integer selected from 0, 1 or 2;

n is an integer selected from 1 or 2;

p is an integer selected from 1 or 2;

each R⁴ is independently selected from hydrogen or C$_{1-6}$alkyl;

each R⁵ is independently selected from hydrogen or C$_{1-6}$alkyl;

R⁶ is selected from hydrogen, or a group of formula

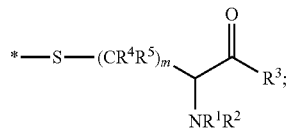

wherein * indicates the point of attachment to the S of formula (I), and

R⁷ is selected from the group comprising hydrogen, C$_{1-6}$alkyl, and C$_{1-6}$alkylcarbonyl.

28. The use according to statement 27, wherein said aliphatic polyester is polylactide.

29. Use of at least one compound of formula (I) in a polylactide composition, for inhibiting generation of lactide in a melt of the polylactide composition.

30. The use according to any one of statements 27-29, wherein said compound of formula (I) is selected from the group comprising cysteine, cystine, N-acetyl-cysteine, N-acetyl-cystine, glutathione, stereoisomers thereof and mixtures thereof.

31. The use according to any one of statements 29-30, wherein said composition further comprises at least one antioxidant such as a vitamin or organo-phosphite antioxidant.

According to the invention a process is provided for the preparation of a stabilized composition comprising aliphatic polyester by ring-opening polymerization of cyclic ester monomers. Said process comprises the steps of: (a) providing cyclic ester monomers and polymerization catalyst to a reactor, (b) melt polymerizing said cyclic ester monomers to form a composition comprising aliphatic polyester, (c) stabilizing the composition against aliphatic polyester depolymerization by incorporating therein or applying thereto at least one stabilizing agent which is a compound of formula (I) thereby obtaining a melt-stable composition, and (d) optionally removing at least a portion of the residual cyclic ester monomers.

Preferably, said process allows a melt-stable polyester composition, preferably a polylactide composition to be obtained when a composition comprising polylactide is stabilized with a compound of formula (I), preferably said compound is used in an amount sufficient to inhibit generation of lactide in the melt.

Preferably, melt-stable polylactide is a polymer which has a stable viscosity at melt-processing temperatures to be processed in existing or commercially-available melt-processing equipment and have sufficiently low rates of lactide reformation so that at the same temperatures the amount of degradation during processing does not substantially affect the physical properties of the final polymeric article or cause significant plating or fouling on processing equipment. These physical properties include molecular weight and viscosity as well as others disclosed herein.

A test of melt stability could include heating a devolatilized sample of polylactide to 250° C. for 20 minutes at atmospheric pressure and measuring the percent by weight generation of lactide.

The present invention pertains to the preparation of a composition using polymerization carried out in the substantial absence of solvent, namely to melt-polymerization. If so desired minor amounts of solvent may be present in the process, for example added as a solvent for the catalyst or further reaction components. The process is preferably intended to encompass situations where the reaction mixture contains less than 5% by weight of solvent, preferably less than 2% by weight, more preferably less than 1% by weight, still more preferably less than 0.5% by weight of solvent, based on the total weight of the reaction mixture.

The polymerization process can be batch melt process or a continuous melt process.

The polymerization is preferably performed in inert conditions, such as under a dry nitrogen or argon blanket.

The ring-opening polymerization can be performed at a temperature of at least 100° C. For example the polymerization can be performed at a temperature ranging from 100° C.-240° C., preferably from 100° C.-220° C., yet more preferably from 100° C.-200° C.

The main reactants provided to the reactor include lactide and polymerization catalyst. If so desired, additional components such as co-catalyst, initiator for molecular weight control and/or additives may also be added. The components can be added to the reactor directly, either pure or in a solvent, or (some of) the reactants may be combined prior to addition to the reactor. The point of addition of the additives will depend on the function of the additive; antioxidants may for example be added prior to the first polymerization, whereas catalyst deactivators are generally added after the polymerization is completed.

Suitable cyclic ester monomers are monomers encompassing 5-7 covalently linked carbon atoms in the ring, at least one, generally one or two, oxygen atoms in the ring, and a carbonyl oxygen atom substituted onto the carbon atom adjacent to the oxygen atom in the ring (generating together the ester linkage). Where there are more than one oxygen atoms in the ring, oxygen atoms may be substituted on the adjacent carbon atoms for all oxygen atoms, or just for one. The carbon atoms in the ring may be substituted with $C_{1-4}$alkyl groups. Suitable monomers include lactide, glycolide, trimethylene carbonate, epsilon-caprolactone, p-dioxanone and mixtures thereof. Where more than one type of monomer is used, a polyester copolymer will be obtained.

Lactide is the preferred cyclic ester monomer to be used as starting material, whether or not in combination with one or more of glycolide, trimethylene carbonate, and epsilon-caprolactone. The lactide used in the present invention may be L-lactide (derived from two L-lactic acid molecules), D-lactide (derived from two D-lactic acid molecules), meso-lactide (derived from an L-lactic acid molecule and a D-lactic acid molecule), or a mixture of two or more of the above. A 50/50 mixture of L-lactide and D-lactide with a melting point of about 126° C. is often referred to in the literature as D,L-lactide or rac-lactide. Mixtures of the aforementioned lactides are also suitable for use in the process.

In some embodiments, the lactide used as starting material is L-lactide with up to 50% by weight of other lactides. For example, the lactide used as starting material may be L-lactide containing between 50 and 10% D-lactide. In other embodiments, the lactide is substantially pure L-lactide, where the wording substantially pure means that it may contain up to 10% by weight of other lactides, for example, up to 5% by weight, or up to 1% by weight. In other embodiment, the lactide is substantially pure D-lactide, where the wording substantially pure means that it may contain up to 10% by weight of other lactides, for example, up to 5% by weight, or up to 1% by weight.

The polymerization catalyst employed for this process may have general formula $M(Y^1, Y^2, \ldots Y^p)_q$, in which M is a metal selected from the group comprising the elements of columns 3 to 12 of the periodic table of the elements, as well as the elements Al, Ga, In, Tl, Ge, Sn, Pb, Sb, Ca, Mg and Bi; whereas $Y^1, Y^2, \ldots Y^p$ are each substituents selected from the group comprising linear or branched alkyl with 1 to 20 carbon atoms, aryl having from 6 to 30 carbon atoms, alkoxy having from 1 to 20 carbon atoms, aryloxy having from 6 to 30 carbon atoms, and other oxide, carboxylate, and halide groups as well as elements of group 15 and/or 16 of the periodic table; p and q are integers of from 1 to 6. As examples of suitable catalysts, we may notably mention the catalysts of Sn, Ti, Zr, Zn, and Bi; preferably an alkoxide or a carboxylate and more preferably $Sn(Oct)_2$, $Ti(OiPr)_4$, $Ti(2-ethylhexanoate)_4$, $Ti(2-ethylhexyloxide)_4$, $Zr(OiPr)_4$, Zirkonium tris(phenolates) as mentioned in WO2014/177543, (2,4-di-tert-butyl-6-(((2-(dimethylamino) ethyl)(methyl)amino)methyl)phenoxy) (ethoxy)zinc, or $Zn(lactate)_2$.

The catalyst concentration can be generally at least 5 ppm, calculated as metal weight, more in particular at least 10 ppm, for example at least 30 ppm, for example at least 40 ppm. The catalyst concentration can be generally at most 300 ppm, in particular at most 150 ppm.

If so desired, co-catalyst may be added to the lactide and the catalyst, that is, a compound that further increases the polymerization rate. Suitable co-catalysts are known in the art. Reference is made, for example, to U.S. Pat. No. 6,166,169.

The process can be performed in the presence of a co-initiator of formula $R^9$—OH, wherein $R^9$ is selected from the group consisting of $C_{1-20}$alkyl, $C_{6-30}$aryl, and $C_{6-30}$aryl$C_{1-20}$alkyl optionally substituted by one or more substituents selected from the group consisting of halogen, hydroxyl, and $C_{1-6}$alkyl. Preferably, $R^9$ is selected from $C_{3-12}$alkyl, $C_{6-10}$aryl, and $C_{6-10}$aryl$C_{6-12}$alkyl, optionally substituted by one or more substituents, each independently selected from the group consisting of halogen, hydroxyl, and $C_{1-6}$alkyl; preferably, $R^9$ is selected from $C_{3-12}$alkyl, $C_{6-10}$aryl, and $C_{6-10}$aryl$C_{1-12}$alkyl, optionally substituted by one or more substituents, each independently selected from the group consisting of halogen, hydroxyl and $C_{1-4}$alkyl. The initiator can be a mono-alcohol. The alcohol can be a polyol such as diol, triol or higher functionality polyhydric alcohol. The alcohol may be derived from biomass such as for instance glycerol or propanediol or any other sugar-based alcohol such as for example erythritol. The alcohol can be used alone or in combination with another alcohol. In an embodiment, non-limiting examples of initiators include 1-octanol, 1-decanol, isopropanol, propanediol, trimethylolpropane, 2-butanol, 3-buten-2-ol, 1,3-butanediol, 1,4-butanediol, 1,6-hexanediol, 1,7-heptanediol, benzyl alcohol, 4-bromophenol, 1,4-benzenedimethanol, and (4-trifluoromethyl)benzyl alcohol; preferably, said compound is selected from 1-octanol, isopropanol, and 1,4-butanediol. It is understood that similar initiators yet with another nucleophilic group like an amine group may also be used. Macromolecules may also be used as initiators as long as they contain suitable end groups like hydroxyl- or amine end groups.

Selection of an appropriate co-catalyst, initiator and optional additives such as anti-oxidants, phosphates, epoxidized vegetable oil, plasticizers, catkillers, etcetera, is within the scope of the person skilled in the art.

Preferably, the polymerization reaction is carried until lactide equilibrium. Conversion is to be determined directly after polymerization or real-time by online techniques such as mid-IR, near-IR and Raman spectroscopy, for example online with Raman spectroscopy and offline with Gas Chromatography.

In one embodiment, the composition thus obtained is subjected to a devolatilization step to reduce the monomer content of the composition. Prior to or simultaneously with the devolatilization step, the composition is subjected to a stabilization step using at least one compound of formula (I).

The present invention therefore also encompasses a process for stabilizing an aliphatic polyester composition against depolymerization which comprises incorporating therein or applying thereto at least one compound of formula (I). Preferably said process for stabilizing an aliphatic polyester against depolymerization, comprises the steps of (a) forming an aliphatic polyester, and (b) stabilizing the polyester against depolymerization by incorporating therein or applying thereto at least one stabilizing agent, thereby obtaining a melt-stable polyester, wherein said stabilizing agent is a compound of formula (I).

The present invention also encompasses the use of a compound of formula (I) as a stabilizing agent against aliphatic polyester depolymerization, preferably against polylactide depolymerization. The present invention also encompasses the use of at least one compound of formula (I) in a polylactide composition, for inhibiting generation of lactide in a melt of the polylactide composition.

Said compound of formula (I) can be incorporated therein or applied thereto in an amount of at least 0.010% by weight by weight based on the total weight of said aliphatic polyester composition, for example at least 0.025% by weight based on the total weight of said aliphatic polyester composition, preferably said polylactide composition. For example, said compound of formula (I) can be incorporated therein or applied thereto in an amount of at least 0.050% by weight, for example at least 0.075% by weight, for example at least 0.090% by weight, for example at least 0.10% by weight, based on the total weight of said aliphatic polyester composition, preferably said polylactide composition. For example, said compound of formula (I) can be incorporated therein or applied thereto in an amount of at most 0.50% by weight based on the total weight of said aliphatic polyester composition, preferably of said polylactide composition. For example, said compound of formula (I) can be incorporated therein or applied thereto in an amount of at most 0.30% by weight, for example at most 0.20% by weight, for example at most 0.18% by weight, for example at most 0.15% by weight, based on the total weight of said aliphatic polyester composition, preferably said polylactide composition.

Suitable compounds of formula (I) are compounds wherein:
$R^1$ is hydrogen or $C_{1-6}$alkyl; preferably $R^1$ is hydrogen or $C_{1-5}$alkyl; preferably $R^1$ is hydrogen or $C_{1-2}$alkyl; preferably $R^1$ is hydrogen or methyl; preferably $R^1$ is hydrogen;
$R^2$ is selected from the group comprising hydrogen, $C_{1-6}$alkyl, HO—C(=O)—CH(NHR$^7$)—(CH$_2$)$_n$—C(=O)—, and $C_{1-6}$alkylcarbonyl; preferably $R^2$ is selected from the group comprising hydrogen, $C_{1-4}$alkyl, HO—C(=O)—CH(NH$_2$)—(CH$_2$)$_2$—C(=O)—, and $C_{1-4}$alkylcarbonyl; preferably $R^2$ is selected from the group comprising hydrogen, $C_{1-2}$alkyl, HO—C(=O)—CH(NH$_2$)—(CH$_2$)$_2$—C(=O)—, and $C_{1-2}$alkylcarbonyl; preferably $R^2$ is selected from the group comprising hydrogen, methyl, ethyl, HO—C(=O)—CH(NH$_2$)—(CH$_2$)$_2$—C(=O)—, and methylcarbonyl;
$R^3$ is selected from the group comprising hydroxyl, $C_{1-6}$alkoxy and —NH—(CH$_2$)$_p$—C(=O)—OH; preferably $R^3$ is selected from the group comprising hydroxyl, $C_{1-4}$alkoxy and —NH—(CH$_2$)$_p$—C(=O)—OH; preferably $R^3$ is selected from the group comprising hydroxyl, $C_{1-2}$alkoxy and —NH—CH$_2$—C(=O)—OH; preferably $R^3$ is selected from the group comprising hydroxyl, methoxy and —NH—CH$_2$—C(=O)—OH; preferably $R^3$ is hydroxyl or —NH—(CH$_2$)$_p$—C(=O)—OH;
m is an integer selected from 0, 1 or 2; preferably m is 1, or 2; preferably m is 1;
n is an integer selected from 1 or 2; preferably n is 2;
p is an integer selected from 1 or 2; preferably p is 1;
each $R^4$ is independently selected from hydrogen or $C_{1-6}$alkyl; preferably each $R^4$ is independently selected from hydrogen or $C_{1-4}$alkyl; preferably each $R^4$ is independently selected from hydrogen or $C_{1-2}$alkyl; preferably each $R^4$ is independently selected from hydrogen or methyl; preferably each $R^4$ is hydrogen;
each $R^5$ is independently selected from hydrogen or $C_{1-6}$alkyl; preferably each $R^5$ is independently selected from hydrogen or $C_{1-4}$alkyl; preferably each $R^5$ is independently selected from hydrogen or $C_{1-2}$alkyl; preferably each $R^5$ is independently selected from hydrogen or methyl; preferably each $R^5$ is hydrogen;
$R^6$ is selected from hydrogen, or a group of formula

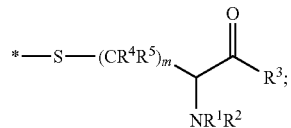

wherein * indicates the point of attachment to the S of formula (I), and
$R^7$ is selected from the group comprising hydrogen, $C_{1-6}$alkyl, and $C_{1-6}$alkylcarbonyl; preferably $R^7$ is selected from hydrogen or $C_{1-4}$alkyl; preferably $R^7$ is selected from hydrogen or $C_{1-2}$alkyl; preferably $R^7$ is selected from hydrogen or methyl; preferably $R^7$ is hydrogen;
Preferred compounds of formula (I) are compounds wherein $R^1$ is hydrogen; $R^2$ is selected from the group comprising hydrogen, $C_{1-6}$alkyl, HO—C(=O)—CH(NHR$^7$)—(CH$_2$)$_n$—C(=O)—, and $C_{1-6}$alkylcarbonyl; $R^3$ is hydroxyl or —NH—CH$_2$—C(=O)—OH; m is an integer selected from 1 or 2; n is 2; p is 1; each $R^4$ and $R^5$ is hydrogen;
$R^6$ is selected from hydrogen, or a group of formula

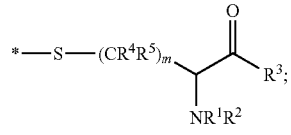

and $R^7$ is hydrogen.
Preferred compounds of formula (I) are compounds wherein $R^1$ is hydrogen; $R^2$ is selected from the group comprising hydrogen, HO—C(=O)—CH(NH$_2$)—(CH$_2$)$_2$—C(=O)—, and methylcarbonyl; $R^3$ is hydroxyl or —NH—CH$_2$—C(=O)—OH; m is 1; n is 2; p is 1; each $R^4$ and $R^5$ is hydrogen;
$R^6$ is selected from hydrogen, or a group of formula

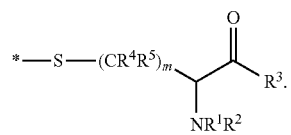

Preferably, said compound of formula (I) is selected from the group comprising cysteine, cystine, N-acetyl-cysteine, N-acetyl-cystine, glutathione, stereoisomers thereof and mixtures thereof. Most preferred compounds are L-cysteine, L-cystine, N-acetyl-L-cysteine, N-acetyl-L-cystine, glutathione, D-cysteine, D-cystine, N-acetyl-D-cysteine, N-acetyl-D-cystine, and mixtures thereof.

Unless otherwise stated, the chemical designation of compounds denotes the mixture of all possible stereochemically isomeric forms, said mixtures containing all diastereomers and enantiomers (since the compounds of formula (I) have at least one chiral center) of the basic molecular structure, as well as the stereochemically pure or enriched compounds. As used herein and unless otherwise stated, the term "enantiomer" means each individual optically active form of a compound, having an optical purity or enantiomeric excess (as determined by methods standard in the art) of at least 80% (i.e. at least 90% of one enantiomer and at most 10% of the other enantiomer), preferably at least 90% and more preferably at least 98%.

In addition to adding the compounds of formula (I), further additives, such as antioxidants or other stabilizers, can be added to the composition.

Non-limiting examples of suitable additional compounds for stabilization include anti-oxidants such as vitamins, phosphite-containing compounds, multi-functional carboxylic acids, hindered phenolic compounds, organic peroxides, catalyst deactivating agents such as hindered alkyl, aryl and phenolic hydrazides, amides of aliphatic and aromatic mono- and dicarboxylic acids, cyclic amides, hydrazones and bishydrazones of aliphatic and aromatic aldehydes, hydrazides of aliphatic and aromatic mono- and dicarboxylic acids, bis-acylated hydrazine derivatives, heterocyclic compounds, endcapping with anhydrides, and mixtures thereof.

Preferable antioxidants are phosphite-containing compounds, hindered phenolic compounds or other phenolic compounds. Antioxidants include such compounds as trialkyl phosphites, mixed alkyl/aryl phosphites, alkylated aryl phosphites, sterically hindered aryl phosphites, aliphatic spirocyclic phosphites, sterically hindered phenyl spirocyclics, sterically hindered bisphosphonites, vitamins, hydroxyphenyl propionates, hydroxy benzyls, alkylidene bisphenols, alkyl phenols, aromatic amines, thioethers, hindered amines, hydroquinones and mixtures thereof.

Preferably the antioxidant is a phosphite which may be a compound of formula (II) or (III):

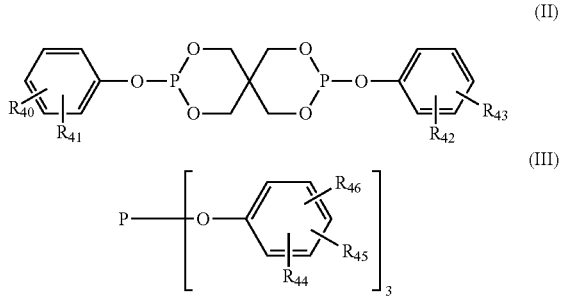

wherein $R_{40}$, $R_{41}$, $R_{42}$ and $R_{43}$ are independently $C_{1-8}$alkyl; or $R_{40}$ and $R_{42}$ may independently be hydrogen; $R_{44}$, $R_{45}$ and $R_{46}$ are independently hydrogen or $C_{1-8}$alkyl.

Suitable phosphites include but are not limited to

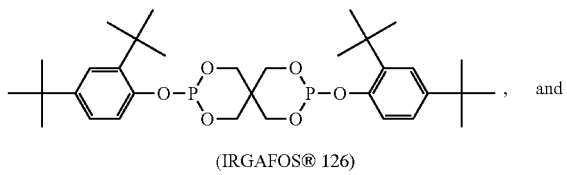

(IRGAFOS® 126)

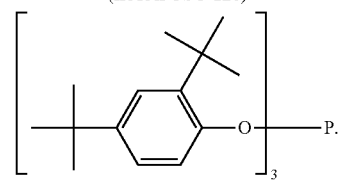

(IRGAFOS® 168)

The additives and stabilizers mentioned herein are mainly commercially available.

The polymer is treated with the stabilization compounds by admixing the stabilizing compound with the composition, e.g., at a temperature of the same order as the polymerization temperature. This can be done by means of a static mixer, an extruder, or any other conventional way of mixing materials of which at least one is highly viscous.

The composition can be also subjected to a devolatilization step (d). The devolatilization step is carried out to remove volatiles, in particular unreacted monomer from molten or solid polymer. The volatiles are removed at increased temperature under reduced pressure, e.g. under vacuum.

Examples of devolatilizers include extruders, especially twin screw extruders, wiped film evaporators, falling film evaporators, rotary devolatilizers, rotary disk devolatilizers, centrifugal devolatilizers, flat plate devolatilizers, and static expansion chambers, such as those involving special distributors, e.g., Sulzer devolatilization technology as described in EP1800724.

The use of a static expansion chamber can be considered, devolatilization in various stages and/or a combination of various types of apparatus is also possible. A stripping gas such as nitrogen can be applied to one or several stages in order to facilitate devolatilization. Devolatilization may also be conducted through solid-state post-polymerization or by drying of solid pelletized product under vacuum or inert gas flow, e.g., in a tumble dryer. Optionally, a crystallization step may be performed before the drying step.

The composition can then be directly further processed to end-use by extrusion, blow-molding, film casting, film blowing, thermoforming, foaming, or fiber-spinning at elevated temperatures to form useful articles. If so desired, the polymer may be compounded with additives such as anti-oxidants, nucleating agents, mineral fillers, glass or natural fibers, processing aids, UV-stabilizers, or other polymer-additives known to the skilled person.

It is also possible to process the composition into particles such as beads, chips, or other pelletized or powdered products in manners known in the art and then sold to end-users.

The present invention will be elucidated by the following Examples, without being limited thereto or thereby.

EXAMPLES

Materials

The following chemicals where used
Lactide: Puralact L B3 Resin Grade, Corbion Thailand, ≥99% (w/w)
Initiator: 2-Ethyl-1-Hexanol, Acros, 99%
Catalyst and solvent: TinOctoate, Sigma, 92.5-100.0%, Toluene, Fisher, 99.8+%, for analysis
Stabilizing agents tested listed in Table A:

TABLE A

| | |
|---|---|
| Irganox 565, 4-((4,6-Bis(octylthio)-1,3,5-triazin-2-yl)amino)-2,6-di-tert-butylphenol, BASF, >99% | 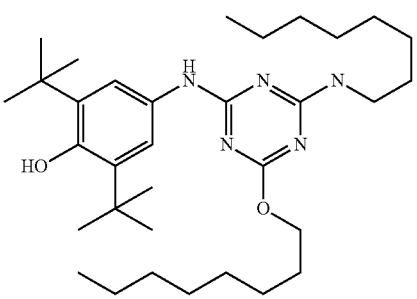 [SMILES: CCCCCCCCNc1nc(Nc2cc(C(C)(C)C)c(O)c(C(C)(C)C)c2)nc(OCCCCCCCC)n1] |
| Irganox 1520L, 2-Methyl-4,6-bis(octylsulfanylmethyl)phenol, BASF, ≥96% | 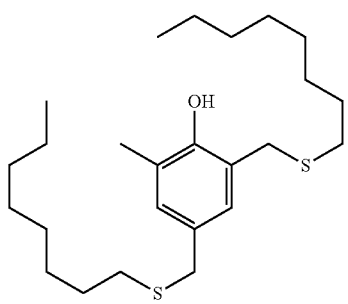 [SMILES: CCCCCCCCSCc1cc(C)c(O)c(CSCCCCCCCC)c1] |
| Irgafos 126, Bis(2,4-di-tert-butylphenyl) pentaerythritol diphosphate, BASF, 99% | 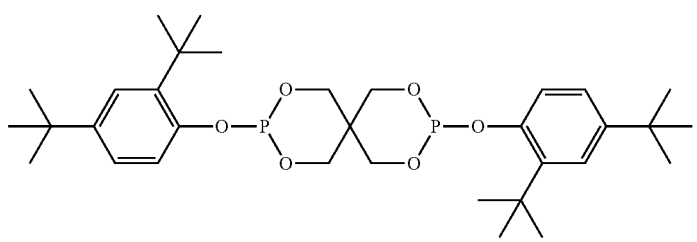 [SMILES: CC(C)(C)c1ccc(OP2OCC3(CO2)COP(Oc2ccc(C(C)(C)C)cc2C(C)(C)C)OC3)c(C(C)(C)C)c1] |
| ADK Stab AO-412S, pentaerythritol tetrakis (β-laurylthiopropionate), Adeka Palmarole, >99% | 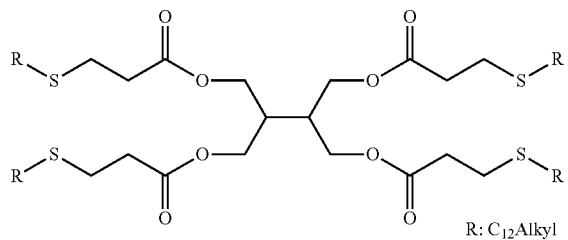 R: $C_{12}$Alkyl |
| Arenox DS, 3,3'-Thiodipropionic acid di-n-octadecyl ester, Adeka Palmarole, 99% | 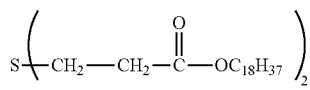 |

TABLE A-continued

Thiocure PETMP, Pentaerythritol Tetra(3-mercaptopropionate), Brentag, >96%

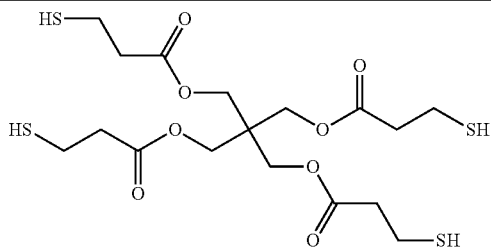

Hostanox SE10 PILLS, Dioctadecyl disulfide, Clariant, >99%

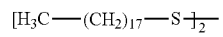

DiEthyleneTriAminePentaAceticAcid (DETAPAA), Sigma Aldrich, ≥96%

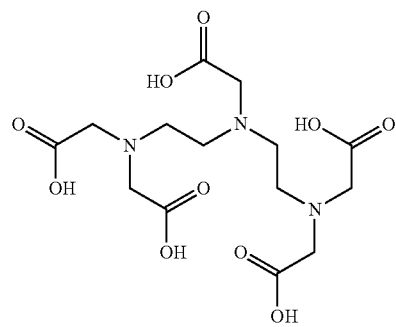 [SMILES: O=C(O)CN(CCN(CC(=O)O)CC(=O)O)CCN(CC(=O)O)CC(=O)O]

N-Acetylglycine, Sigma Aldrich, ReagentPluse ®, 99%

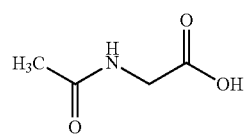

N-Acetyl-L-Cysteine, Sigma Aldrich, ≥99%

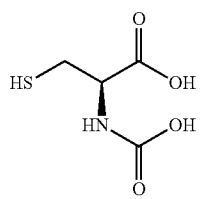

L-Cysteine, Sigma Aldrich, 97%

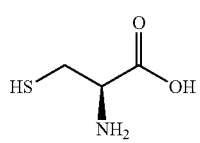

L-Cystine, Sigma Aldrich, ≥98%

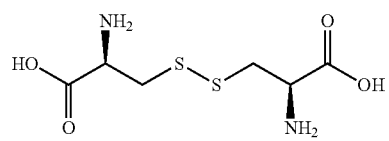

Glutathione, Acros, 98% for analysis

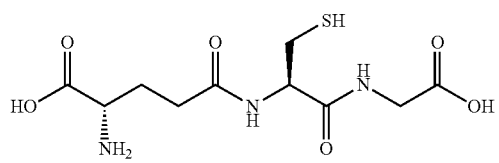 [SMILES: N[C@@H](CCC(=O)N[C@@H](CS)C(=O)NCC(=O)O)C(=O)O]

Analyses

Absolute Molecular Weight

Absolute molecular weight parameters $M_n$, $M_w$ and polydispersity index (PDI) were determined using Gel Permeation Chromatography (GPC) with light scattering detection, unless mentioned otherwise. In particular, A Viscotek GPC Mx VE2001 system was used with 1,1,1,3,3,3-hexafluoro-2-propanol (also known as hexafluoroisopropanol or HFiP) with 0.02 M $CF_3COOK$ as solvent at a flow rate of 0.7 mL/min. The size exclusion columns used were two PSS PFG analytical linear columns (M, 300×8.00 mm, 7 μm) connected in series. 20-25 mg of a sample of polymerization mixture was weighed in a 20 ml crimp cap vial and 17 gram HFiP were added thereto. The suspension obtained was shaken for at least 16 hours at room temperature. After 16 hours 1 ml of the sample was filtered through a PVDF 0.45 µm filter, transferred to a 2 ml vial and injected to the GPC system for analysis.

Amount of Residual Lactide

The amount of residual lactide in a polylactide sample was determined by a precipitative method to separate the monomeric lactide from the polymeric lactide in the polymerization mixture. A sample of the first polymerization mixture (comprising polylactide and lactide monomer) was dissolved in a known amount of dicholoromethane (including internal standard). The polylactide fraction of the polymerization mixture was then removed by precipitation by introducing the dichloromethane solution into an excess amount of 5/95 acetone/hexane solvent mixture. After half an hour of precipitation, the polymeric fraction was removed by filtration over a 0.45 µm filter. The remaining solution was then analyzed using Gas Liquid Chromatography, to determine the amount of lactide monomer in the sample.

Stereochemical Purity

The stereochemical purity of PLA was assessed after destructive methylation. To that end 0.1 g of PLA was brought into a crimp cap vial, subsequently 2.0 g of dichloromethane (pure, Acros Organics) and 5.0 g of methanol (J. T. Baker) were added and the sample was allowed to dissolve for 2 hours at 70° C. After cooling down to room temperature, 3.0 g of Amberlyst 15 (ion exchange resin, dry, Acros Organics) was added and the saponification reaction was allowed to proceed for 22 hours at 80° C. After cooling down to room temperature, the sample was subjected to chiral gas chromatography separation on a Thermo Focus GC equipped with a CP-Chirasil-dex CB separation column. This achieved separation of the R- and S-methyl lactates, the ratio of which finally determined the stereochemical purity of the sample.

Ring-Opening Polymerizations

Ring-opening polymerizations of lactides were performed in a 2 liter batch reactor. All polymerizations were performed using 150 ppm Tin Octoate, and 20 Meq/kg 1-Ethyl-2-Hexanol.

Before feeding lactide to the batch reactor, the reactor was subjected to a vacuum of 3 mbar. Subsequently, the vacuum was released to by adding nitrogen to the reactor. This vacuum/nitrogen cycle was performed 3 times to remove any remaining ambient atmosphere. To the dry reactor, 750 gram of Puralact L polymer grade was added to the reactor. Subsequently the vacuum/nitrogen cycles were performed on the lactide flakes in the cold reactor. After the L-lactide was molten to 130° C. under nitrogen atmosphere, initiator: 1.97 g 2-Ethyl-1-Hexanol, and catalyst: 1.13 gr 10% (w/w) TinOctoate/Toluene solution, were added to start the polymerization. In order to better control the added TinOctoate quantity, it was first dissolved in toluene and injected into the reactor. The temperature of the melt was increased to 180° C. For 120 minutes, the temperature was kept at 180° C. and the melt was stirred at 50 rpm.

All stabilizers were then tested by adding them to the reactor after reaching lactide equilibrium. After 0.1% by weight of the stabilizer was added in the batch reactor to the polymerization mixture, it was allowed to mix for 15 minutes at 180° C. Immediately after, the reactor content was off-loaded into steel buckets cooled in ice water and subsequently shredded into millimeter-sized chips. The chips were spread in a Petri-dish, which was subsequently placed in a vacuum-oven at 130° C. A vacuum of 5 mbar was applied with a small nitrogen bleed and the degassing step was allowed to proceed under these conditions for 16 hours.

Samples of the native PLA and of the corresponding stabilized PLA were analyzed with respect to molecular weight and residual lactide monomer content, as well as lactide reformation and rheological behavior.

The effectivity of the stabilizing agents was assessed using a lactide reformation experiment. During this test a Melt Flow Indexer is heated to 250° C. and filled with 5 grams of sample. Under normal atmosphere and 250° C. the sample remains stationary for 20 minutes. The thermally aged sample is off-loaded and lactide content is analyzed. The lactide content of the thermally aged sample is compared to the lactide content of the non-thermally aged sampled. To be quantified as a thermally stable specimen, the sample should have less than 0.3% lactide increase, compared to the non-thermally aged sample. The results are shown in Table 1.

TABLE 1

| | | Lactide reformation Lactide [% (w/w)] | | |
|---|---|---|---|---|
| Example | Sample | Before reformation | After reformation | Difference |
| Comparative | PLA after devolatilization | 0.55 | 6.6 | 6.1 |
| Example 1 | PLA+ Irganox 565 after devo | 0.58 | 4.8 | 4.2 |
| Comparative | PLA after devo | 0.29 | 8.3 | 8 |
| Example 2 | PLA + ADK AO-412S after devo | 0.60 | 7.7 | 7.1 |
| Comparative | PLA after devo | 0.43 | 8.3 | 7.9 |
| Example 3 | PLA + Arenox DS after devo | 0.54 | 8.6 | 8.1 |
| Comparative | PLA after devo | 0.32 | 7.7 | 7.4 |
| Example 4 | PLA + DETAPAA after devo | 0.26 | 5.6 | 5.3 |
| Comparative | PLA after devo | 0.27 | 7.6 | 7.3 |
| Example 5 | PLA + Irganox 1520L after devo | 0.40 | 7.3 | 6.9 |
| Comparative | PLA after devo | <0.07 | 0.54 | 0.54 |
| Example 6 | PLA + N-Acetylglycine after devo | <0.07 | 0.53 | 0.53 |
| Comparative | PLA after devo | 0.09 | 6.5 | 6.4 |
| Example 7 | PLA + Hostanox SE10 after devo | 0.39 | 8.5 | 8.1 |
| Comparative | PLA after devo | 0.90 | 2.0 | 1.1 |

TABLE 1-continued

| | | Lactide reformation Lactide [% (w/w)] | | |
|---|---|---|---|---|
| Example | Sample | Before reformation | After reformation | Difference |
| Example 8 | PLA + Thiocure PETMP after devo | 0.47 | 8.5 | 8.0 |
| Example 1 | PLA after devo | <0.07 | 0.47 | 0.47 |
| | PLA + L-Cysteine after devo | <0.07 | <0.07 | 0 |
| Example 2 | PLA after devo | 0.20 | 6.3 | 6.1 |
| | PLA + N-Acetyl-L-Cysteine after devo | 1.1 | 0.72 | 0 |
| Example 3 | PLA after devo | 1.5 | 8.0 | 6.5 |
| | PLA + L-Cystine after devo | 1.3 | 1.2 | 0 |
| Example 4 | PLA after devo | 0.58 | 7.14 | 6.56 |
| | PLA + Glutathione after devo | 1.39 | 0.65 | 0 |
| Example 5 | PLA after devo | 0.41 | 4.4 | 4 |
| | PLA + Irgafos 126 after devo | 0.76 | 3.4 | 2.6 |
| Example 6 | PLA + Irgafos 126 + L-Cysteine after devo | 0.74 | 0.68 | 0 |

Comparative Examples 1-8

As can be seen in Table 1, except for the compounds for use in the invention, all the other compounds tested show more than 0.3% by weight lactide reformation. These additives are therefore not effective catalyst deactivating agents.

Examples 1-6

Also shown in Table 1 are examples 1-6 of the invention, where L-Cysteine, L-Cystine, n-Acetyl-L-cysteine, and Glutathione all show positive results in inhibiting lactide reformation. These compounds effectively prevent the back biting reaction, thus proving their effect as a catalyst deactivator. The compounds for use in the invention uniformly showed less than 0.3% by weight of lactide reformed when exposed to 250° C. for 20 minutes. These compounds are effectively good stabilizing agents.

From Example 6 one also concludes that a combination of antioxidant Irgafos 126 and L-Cysteine results in a thermally stable PLA. In addition, the incorporation of Irgafos 126 into the polymerization at lactide equilibrium improved the color of the stabilized PLA versus Example 5

The samples of PLA containing L-Cysteine, n-Acetyl-L-Cysteine, L-Cystine and Glutathione were exposed to a rheological Time Sweep (30 minutes, 10% amplitude, 1 s$^{-1}$ angular frequency) at 250° C.; the unstabilized PLA sample was compared versus the stabilized sample. Before measurement all samples was dried in an dry-air-dryer to reduce the moisture-content to below 100 ppm. An Anton Paar MCR301 rotational rheometer was used, equipped with a Plate-Plate geometry of 25 mm, where the bottom plate was heated and the top plate and the atmosphere was heated with an electric oven to 250° C. Approximately 2 g of sample was added to the bottom plate, which was at 250° C., and the top plate was lowered to a gap distance of 5 mm. The sample was allowed to melt for 5 minutes at this setting after which the top plate was lowered to a gap distance of 0.5 mm and the excess of sample was removed. Subsequently the electric oven was placed back over the plates and sample and the measurement was started. For 30 minutes the top plates oscillated with a speed of 1 s$^{-1}$ and amplitude of 10% at 250° C. During these 30 minutes, the rheometer measured the resistance to the oscillation which is a measurement for the complex viscosity.

Stabilized PLA should have a higher complex viscosity during the start of the measurement and should stay at a higher level for a longer time. These results are presented in FIGS. 1-4. The results for the comparative examples are presented in FIGS. 5-7.

Figure 5:
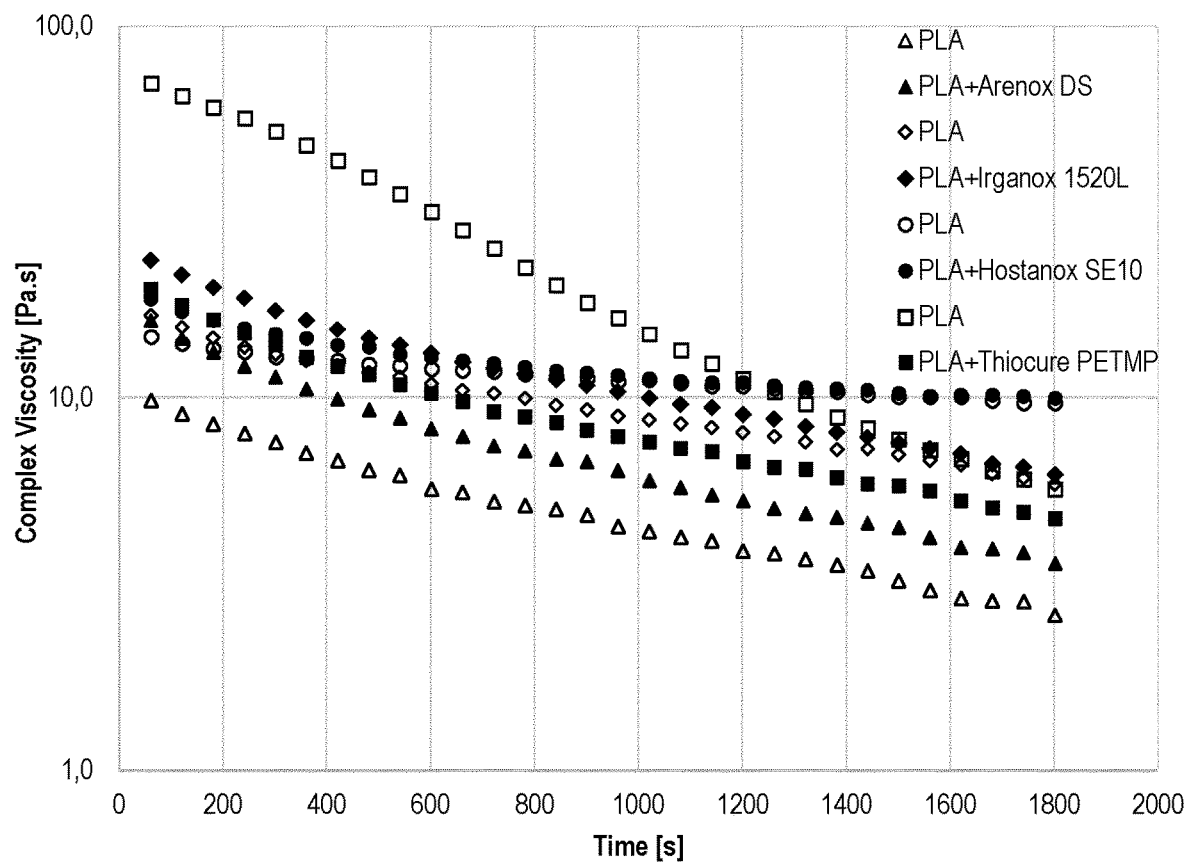
FIG. 5 represents a graph plotting the complex viscosity as a function of time for several comparative PLA samples.
Figure 6:
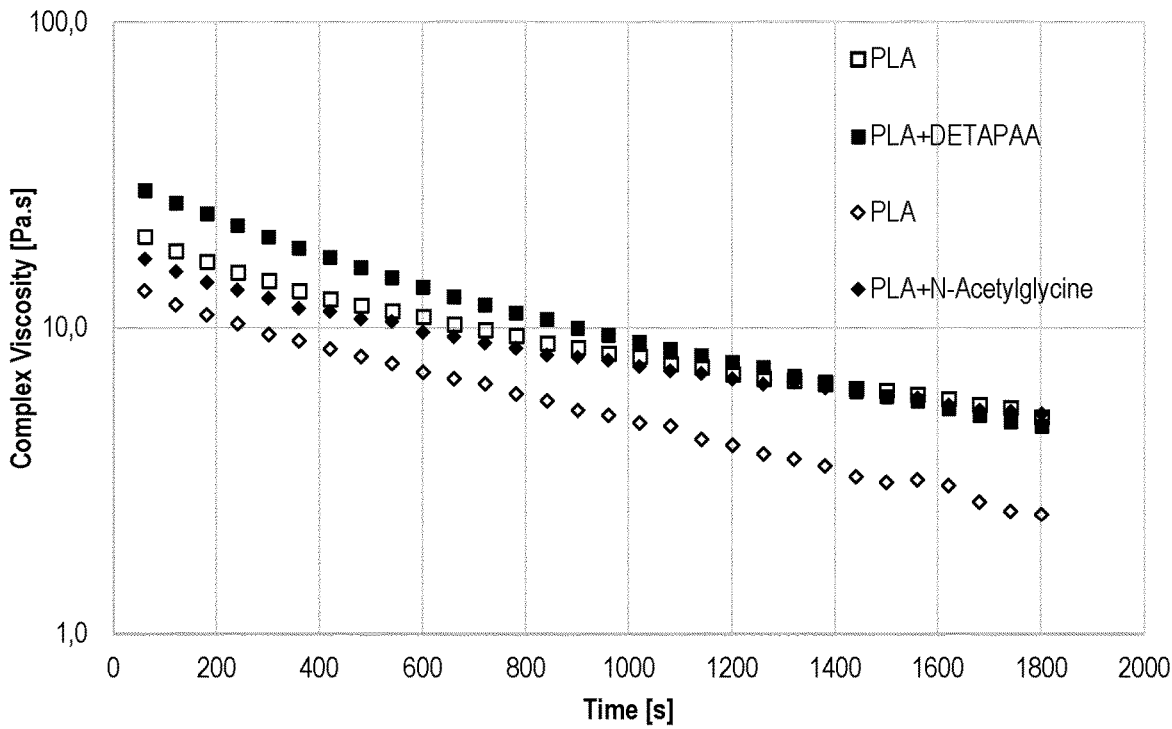
FIG. 6 represents a graph plotting the complex viscosity as a function of time for several comparative PLA samples.
Figure 7:
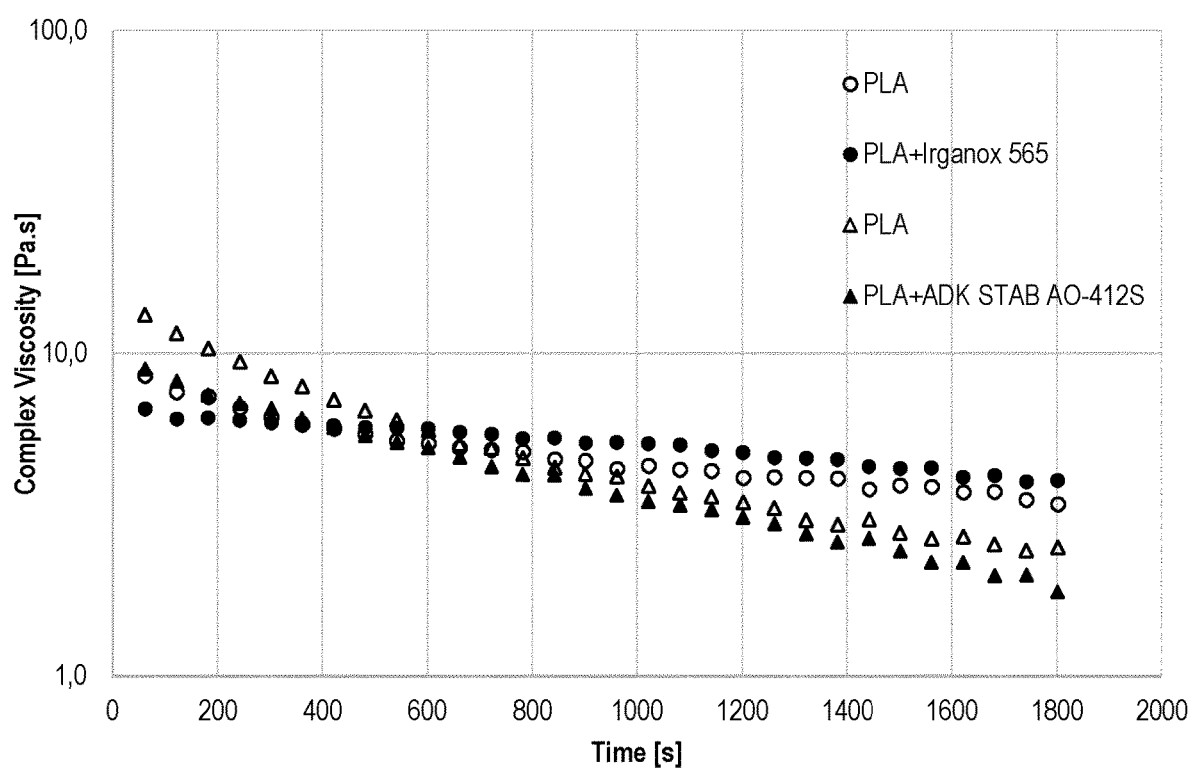
FIG. 7 represents a graph plotting the complex viscosity as a function of time for several comparative PLA samples.

FIGS. 1-7 shows that the results of the time sweep experiment are comparable with the lactide reformation experiment. The compounds for use in the invention showed the highest stabilizing effect (FIGS. 1-4), compared to the other agents tested (FIGS. 5-7). Time sweeps at 250° C. show an increased and stabilized viscosity of the stabilized samples versus the native PLA for the compounds for use in the invention. This confirms the stabilizing effect of L-Cysteine, n-Acetyl-L-Cysteine, L-Cystine and Glutathione. From the rheology data shown in FIGS. 1-4, it can be observed that a higher and more stable level of viscosity was achieved with the stabilized PLA.

The molecular weight retention and racemization of the PLA containing L-Cysteine and L-Cystine was also investigated and the results are shown in Table 2.

TABLE 2

| | Stereochemical Purity | | Absolute |
|---|---|---|---|
| | R-Lactate [% (area/area)] | S-Lactate [% (area/area)] | GPC [kg/mol] Mw |
| PLA after Devo | 0.3 | 99.7 | 68 |
| PLA + L-Cysteine after Devo | 0.3 | 99.7 | 71 |
| PLA after Devo | 0.2 | 99.8 | 68 |
| PLA + L-Cystine after Devo | 0.2 | 99.8 | 69 |

From the molecular weight results (Mw), shown in Table 2 it can be seen that none of the tested compounds for use in the invention had a negative effect on the molecular weight upon addition. The results in Table 2 also show that there is no increase in racemization caused by one of the tested compounds.

From the experimental results, it can be seen that:

L-Cysteine, n-Acetyl-L-Cysteine, L-Cystine and Glutathione all stabilize PLA against thermal degradation, Racemization after addition of the tested compound does not occur for the compound according to formula I.

PLA shows high viscosity retention by the use of L-Cysteine, n-Acetyl-L-Cysteine, L-Cystine and Glutathione as stabilizer.

The invention claimed is:
1. A process for the preparation of a melt-stable composition comprising aliphatic polyester by ring-opening polymerization of cyclic ester monomers, the process comprising the steps of:
(a) providing cyclic ester monomers and polymerization catalyst to a reactor,
(b) melt polymerizing the cyclic ester monomers to form a melt composition comprising aliphatic polyester,
(c) stabilizing the melt composition obtained in step (b) against aliphatic polyester depolymerization by adding at least one stabilizing agent to said melt composition comprising aliphatic polyester thereby obtaining a melt-stable composition, and
(d) optionally removing at least a portion of the residual cyclic ester monomers;
wherein the stabilizing agent is a compound of formula (I)

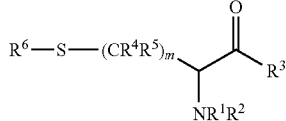

(I)

wherein
$R^1$ is hydrogen or $C_{1-6}$alkyl;
$R^2$ is selected from the group consisting of hydrogen, $C_{1-6}$alkyl, HO—C(=O)—CH(NHR$^7$)—(CH$_2$)$_n$—C(=O)—, and $C_{1-6}$alkylcarbonyl;
$R^3$ is selected from the group consisting of hydroxyl, $C_{1-6}$alkoxy and —NH—(CH$_2$)$_p$—C(=O)—OH;
m is an integer comprising 0, 1 or 2;
n is an integer comprising 1 or 2;
p is an integer comprising 1 or 2;
each $R^4$ is independently hydrogen or $C_{1-6}$alkyl;
each $R^5$ is independently hydrogen or $C_{1-6}$alkyl;
$R^6$ is hydrogen, or a group of formula

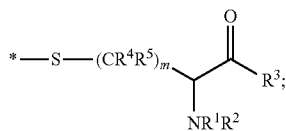

wherein * indicates the point of attachment to the S of formula (I), and
$R^7$ is selected from the group consisting of hydrogen, $C_{1-6}$alkyl, and $C_{1-6}$alkylcarbonyl, and wherein said polymerization catalyst has formula M(Y)$_q$, in which M is a metal selected from the group consisting of the elements of columns 3 to 12 of the periodic table of the elements, Al, Ga, In, Tl, Ge, Sn, Pb, Sb, Ca, Mg and Bi; wherein Y is independently selected from the group consisting of linear or branched alkyl with 1 to 20 carbon atoms, aryl having from 6 to 30 carbon atoms, alkoxy having from 1 to 20 carbon atoms, aryloxy having from 6 to 30 carbon atoms, and other oxide, carboxylate, and halide groups as well as elements of group 15 and/or 16 of the periodic table; and q is an integer from 1 to 6.

2. The process according to claim 1, wherein the aliphatic polyester is polylactide prepared by ring-opening polymerization of lactide, the process comprising the steps of: (a) providing lactide and polymerization catalyst to a reactor, (b) melt polymerizing the lactide to form a melt composition comprising polylactide, (c) stabilizing the melt composition obtained in step (b) against polylactide depolymerization by adding at least one stabilizing agent to said melt composition comprising polylactide, wherein the stabilizing agent is at least one compound of formula (I), thereby obtaining a melt-stable composition, and (d) optionally removing at least a portion of the residual lactide.

3. The process according to claim 1, wherein
$R^1$ is hydrogen;
$R^2$ is selected from the group consisting of hydrogen, $C_{1-6}$alkyl, HO—C(=O)—CH(NHR$^7$)—(CH$_2$)$_n$—C(=O)—, and $C_{1-6}$alkylcarbonyl;
$R^3$ is hydroxyl or —NH—CH$_2$—C(=O)—OH;
m is an integer comprising 1 or 2; n is 2; p is 1;
each $R^4$ and $R^5$ is hydrogen;
$R^6$ is hydrogen, or a group of formula

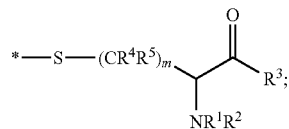

and $R^7$ is hydrogen.

4. The process according to claim 1, wherein compound of formula (I) comprises cysteine, cystine, N-acetyl-cysteine, N-acetyl-cystine, glutathione, stereoisomers thereof, or mixtures thereof.

5. The process according to claim 1, wherein compound of formula (I) is added in step (c) in an amount of at least 0.010% by weight based on the total weight of the melt composition.

6. The process according to claim 1, comprising prior to step (c) or simultaneously with step (c) adding at least one antioxidant.

7. The process according to claim 1, wherein simultaneously or after step (c) the melt composition is subjected to one of more devolatilization steps (d).

8. A melt-stable composition directly obtained by a process according to claim 1, wherein the composition comprises polylactide and at least one compound of formula (I).

9. A process for stabilizing a melt aliphatic polyester against depolymerization, comprising the steps of (a) forming a melt aliphatic polyester by melt polymerizing cyclic ester monomers in the presence of a polymerization catalyst, and (b) stabilizing the melt polyester formed in step (a) against depolymerization by adding at least one stabilizing agent to the formed aliphatic polyester, thereby obtaining a melt-stable polyester, wherein the stabilizing agent is a compound of formula (I);

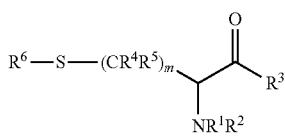

(I)

wherein
$R^1$ is hydrogen or $C_{1-6}$alkyl;
$R^2$ is selected from the group consisting of hydrogen, $C_{1-6}$alkyl, HO—C(=O)—CH(NHR$^7$)—(CH$_2$)$_n$—C(=O)—, and $C_{1-6}$alkylcarbonyl;

$R^3$ is selected from the group consisting of hydroxyl, $C_{1-6}$alkoxy and $-NH-(CH_2)_p-C(=O)-OH$;
m is an integer comprising 0, 1 or 2;
n is an integer comprising 1 or 2;
p is an integer comprising 1 or 2;
each $R^4$ is independently hydrogen or $C_{1-6}$alkyl;
each $R^5$ is independently hydrogen or $C_{1-6}$alkyl;
$R^6$ is selected from hydrogen, or a group of formula

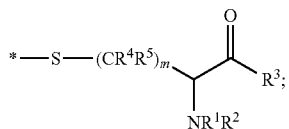

wherein * indicates the point of attachment to the S of formula (I)
$R^7$ is selected from the group consisting of hydrogen, $C_{1-6}$alkyl, and $C_{1-6}$alkylcarbonyl, and wherein said polymerization catalyst has formula $M(Y)_q$, in which M is a metal selected from the group consisting of the elements of columns 3 to 12 of the periodic table of the elements, Al, Ga, In, Tl, Ge, Sn, Pb, Sb, Ca, Mg and Bi; wherein Y is independently selected from the group consisting of linear or branched alkyl with 1 to 20 carbon atoms, aryl having from 6 to 30 carbon atoms, alkoxy having from 1 to 20 carbon atoms, aryloxy having from 6 to 30 carbon atoms, and other oxide, carboxylate, and halide groups as well as elements of group 15 and/or 16 of the periodic table; and q is an integer from 1 to 6.

10. The process according to claim 9, wherein the melt aliphatic polyester is a lactic acid based polyester.

11. The process according to claim 9, wherein the compound of formula (I) is selected from the group consisting of cysteine, cystine, N-acetyl-cysteine, N-acetyl-cystine, glutathione, stereoisomers thereof and mixtures thereof.

12. The process according to claim 9, comprising incorporating or applying further at least anti-oxidant.

13. The process according to claim 1, wherein step (c) is performed after the polymerization has reached its cyclic ester monomer equilibrium.

14. The process according to claim 1, wherein compound of formula (I) is added in step (c) in an amount of at most 0.50% by weight based on the total weight of the aliphatic polyester composition.

15. The process according to claim 9, wherein the melt aliphatic polyester is polylactide.

16. The process according to claim 9, wherein compound of formula (I) is added in an amount of at least 0.010% by weight based on the total weight of the melt aliphatic polyester.

17. The process according to claim 9, wherein compound of formula (I) is added in an amount of at most 0.50% by weight based on the total weight of the melt aliphatic polyester.

* * * * *